United States Patent [19]
Carey et al.

[11] Patent Number: 6,086,733
[45] Date of Patent: Jul. 11, 2000

[54] ELECTROCHEMICAL CELL FOR METAL RECOVERY

[75] Inventors: James J. Carey, Greenville, N.C.; Gary P. Wainwright; Stephen N. Lowery, both of Fairport, N.Y.; Robert B. Call; Peter J. Kelch, both of Rochester, N.Y.

[73] Assignee: Eastman Kodak Company, Rochester, N.Y.

[21] Appl. No.: 09/179,499

[22] Filed: Oct. 27, 1998

[51] Int. Cl.[7] .............................. C25B 9/00; C25B 15/00; C25B 11/03; C25B 11/00; C25B 11/04
[52] U.S. Cl. .................. 204/242; 204/252; 204/260; 204/263; 204/267; 204/272; 204/275; 204/283; 204/284; 204/291; 204/292; 204/293; 204/294
[58] Field of Search ................................ 204/252, 283, 204/272, 260, 271, 242, 263, 267, 275, 284, 291–294; 205/571

[56] References Cited

U.S. PATENT DOCUMENTS

| | | |
|---|---|---|
| 1,842,296 | 1/1932 | Statham et al. .......................... 204/260 |
| 3,953,313 | 4/1976 | Levenson . |
| 4,108,757 | 8/1978 | Fleet et al. . |
| 4,367,127 | 1/1983 | Messing et al. . |
| 4,556,469 | 12/1985 | Kim et al. . |
| 4,680,100 | 7/1987 | Morin . |
| 4,702,806 | 10/1987 | Miller et al. . |
| 4,762,603 | 8/1988 | Morin . |
| 4,911,804 | 3/1990 | Dickson . |
| 5,690,806 | 11/1997 | Sunderland et al. . |
| 5,753,099 | 5/1998 | Gravel et al. ........................ 205/571 X |

FOREIGN PATENT DOCUMENTS

| | | |
|---|---|---|
| 0 021 457 A1 | 3/1980 | European Pat. Off. . |
| 0 079 058 A1 | 11/1982 | European Pat. Off. . |
| 329 275 | 1/1989 | European Pat. Off. . |
| 474 936 | 9/1990 | European Pat. Off. . |
| 2 579 998 | 10/1986 | France . |
| 3-294492A | 12/1991 | Japan . |
| 7258897 | 10/1995 | Japan . |
| 1 395 588 | 5/1988 | U.S.S.R. . |
| 1 804 450 | 3/1993 | U.S.S.R. . |

*Primary Examiner*—Donald R. Valentine
*Attorney, Agent, or Firm*—J. Lanny Tucker

[57] ABSTRACT

A high performance electrochemical cell is useful for recovery of metal from aqueous solutions. The electrochemical cell has a cathode assembly that includes a nonporous support member, a primary cathode, and a nonconductive or conductive porous material covering the primary cathode. An anode is spaced apart from the cathode assembly. Fluid is caused to flow through the porous material to the primary cathode, through openings or fluid collection channels in the nonporous support member, and uniformly out of the cell. Uniform and efficient deposition of metal is accomplished over the entire primary cathode because of modulation of fluid flow and increased mass transfer.

22 Claims, 3 Drawing Sheets

ELECTROCHEMICAL CELL FOR METAL RECOVERY

RELATED APPLICATION

Reference is made to copending and commonly assigned U.S. Ser. No. 09/199,589 filed on even date herewith by Carey, Wainwright, Lowery, Call and Kelch and entitled "METHOD OF METAL RECOVERY USING ELECTROCHEMICAL CELL".

FIELD OF THE INVENTION

This invention relates to a highly efficient electrochemical cell that is useful for metal recovery from solutions. In particular, the electrochemical cell is useful for the recovery of silver from photographic processing solutions.

BACKGROUND OF THE INVENTION

The use of cathodic deposition as an electrolytic technique for the extraction of conductive metals from a solution has long been known. Such techniques are utilized in various industries, including the photographic industry for recovery of silver from photographic processing solutions. Many electrochemical cells and methods are described in the literature, but have not been commercialized because of various disadvantages, particularly with respect to metal recovery from dilute solutions.

It is well known that efficiency in electrochemical processes, such as electrolysis, electroplating, electrowinning, electroorganic synthesis and waste recovery of metals from dilute solutions requires the use of cells with very high mass transfer characteristics or high surface area electrodes. Electrodes have been constructed with ridges or convolutions, or roughened in some manner, to increase the surface area. More recently, carbon fibers have been used as electrodes because they provide higher surface area.

By far, the most common types of electrolytic cells used to recover silver from photographic processing solutions comprise planar cathode cells. Most planar cells operate by passing the solutions across the cathode in a tangential manner, or by rotating the cathode to enhance the tangential flow with turbulence at the electrode boundary layer. Due to the relatively low surface area of planar cathodes, the performance of these cells remains insufficient for every silver recovery need in the photographic industry. It is also known to use mesh electrodes, toughened electrodes, metal and carbon foams and other porous electrodes. Porous electrodes substantially improve the mass transport characteristics within an electrochemical cell. However, this technology has not been embraced in the photographic industry because of various shortcomings.

Porous fibrous carbon or graphite cathodes are described for use in metal recovery from dilute solutions in U.S. Pat. No. 5,690,806 (Sunderland et al). Electrolytic cells containing such materials provide increased surface area and substantially increase the mass transport in a cell, but they are disadvantageous because of limitations of capacity, maintenance and efficiency. The use of a porous cathode support results in poor control of the required flow characteristics that are necessary for desired recovered metal crystal morphology. Uneven flow within the cell also leads to the formation of undesirable water-insoluble by-products, such as silver sulfide, and to metal deposition on the cathode in a dendritic fashion. This then leads to shortened cathode life (shorting out when dendrites on the cathode contact the anode), and to the collection of broken dendrites and other metallic debris at the bottom of the cell.

The Sunderland et al cell also relies predominantly upon a carbon felt to achieve a uniform current distribution along the cathode. This is readily achieved early in cell usage, but is diminished with time as the metal grows on the cathode. Fluid flow is thus a more important consideration for useful cathode life and uniform metal deposition.

Another concern with the described Sunderland et al cell is that it appears to be best used at fairly low metal concentrations, that is below 50 mg/l. Higher concentrations are said to be accommodated but would require more frequent changes in the cathode. This is not practical for many uses of such cells, especially in the photographic processing industry where silver waste levels may reach as much as 15–20 g/l.

Despite the considerable technology disclosed in the art and commercially available for electrochemical processes, there remains a considerable gap between the existing technology and the increasingly rigorous demands placed upon various industries including the photographic industry, for metal recovery.

For example, it is often necessary to use multiple stages of reclamation to achieve the necessary very low levels of metals in dischargable wastewaters. For silver recovery, the process typically begins with electrolytic desilvering to reach silver concentrations in the range of 100 to 500 ppm.

Thus, there remains a need for cost-effective electrochemical cells allowing for recovering metals at either higher or low concentrations (single digit parts per million), with rapid recovery rates (g/min instead of g/hr), high metal loading capacity, simplicity in design and use, easy removal of deposited metal, and compact equipment design. None of the known technologies satisfies all of these needs simultaneously.

SUMMARY OF THE INVENTION

This invention provides an advance in the art with an electrochemical cell comprising:
 a cathode assembly comprising:
  a nonporous support member having uniformly distributed fluid openings or fluid collection channels that provide a uniform fluid pressure drop in the cathode assembly,
  a conductive primary cathode in intimate contact with the support member, and
  at least one porous material covering the primary cathode, and
 an anode spaced from the cathode assembly.

This invention also provides a cathode assembly comprising: a nonporous support member having uniformly distributed fluid openings or fluid collection channels that provide a uniform fluid pressure drop in the cathode assembly, a conductive primary cathode in intimate contact with the support, and at least one porous material covering the primary cathode.

Still again, the present invention provides a metal recovery system that comprises a plurality of the electrochemical cells described above arranged in series. Such systems can further include other apparatus such as fluid pumping means, electrical connections and energy supply and fluid holding containers.

The electrochemical cell of this invention is capable of recovering metal ions that are present at either high or very low concentrations (for example, less than 10 ppm). The high surface primary cathode is capable of removing metal ions at a faster than normal rate due to an increase in the rate of mass transfer. There is also a considerable increase in metal loading capacity due to uniform fluid flow near the primary cathode. In addition, metal is deposited on the cathode in a uniform fashion (no formation of dendrites). Deposited metal is predominantly collected in and on the porous material, that can be either a nonconductive or dielectric porous barrier material or a porous conductive secondary cathode. This porous material can be peeled off the primary cathode with minimal effort, thereby taking off the deposited metal without the tedious mechanical removal processes common in the industry. In addition, the cell design allows for a more robust recovery process (that is, less side reactions) and greater process control.

The electrochemical cells of this invention can be designed for more compact equipment since the geometric cathode area is reduced by a factor of three. Fluid flow can be manipulated by a careful design of the cathode assembly that has a support member that is designed with uniformly distributed small openings or fluid collection channels to provide a uniform fluid pressure drop throughout the cathode assembly. The porous material mentioned above also aids in fluid flow modulation. These features further improve uniform metal deposition on the primary cathode.

In a preferred embodiment, the cathode assembly includes both a nonconductive barrier material and a conductive porous material as the outermost layer. This outermost layer acts as a "secondary cathode" during deposition and further enhances uniform metal deposition as described in more detail below.

Another unique feature of the preferred electrochemical cells of this invention is a significant reduction in the cell working volume. The nonporous support member of the cathode assembly is generally hollow inside. Thus, the volume of fluid required to fill the cell is only that volume of the interelectrode gap.

The specific features of the electrochemical cells are described in more detail below.

DETAILED DESCRIPTION OF THE INVENTION

The heart of the present invention is the use of a high surface area cathode assembly in an electrochemical cell and the manipulation of the fluid and electrical flows in the vicinity of the primary cathode. An unexpectedly strong interaction between fluid flow direction and electron flow direction is used to maximize the surface area of the primary cathode as metal is deposited thereon.

To accomplish this in part, the primary cathode is wrapped by at least one layer of a porous material as described in more detail below. The aqueous solution (hereinafter identified as "fluid") being treated is moved through the porous material and past the primary cathode. As metal deposition progresses, the deposited metal "grows" through the porous material which modifies metal "growth" towards the anode in a very uniform manner with a high surface area. In addition, fluid flow is uniformly directed along the primary cathode by the uniformly distributed openings or channels in the support member of the cathode assembly.

In the preferred mode of operation, fluid flow is from the vicinity of the anode through the porous material to the primary cathode, and the flow of electrons is from the primary cathode to the anode. While there are a number of primary cathode-anode arrangements where this is possible (including a planar geometry), it is most conveniently achieved by having a circular cathode assembly in the center of the electrochemical cell and having the anode coaxially disposed around it. In any arrangement, the cathode assembly and anode are spaced apart from about 0.1 to about 20 cm (preferably from about 3 to about 8 cm).

Figure 3:
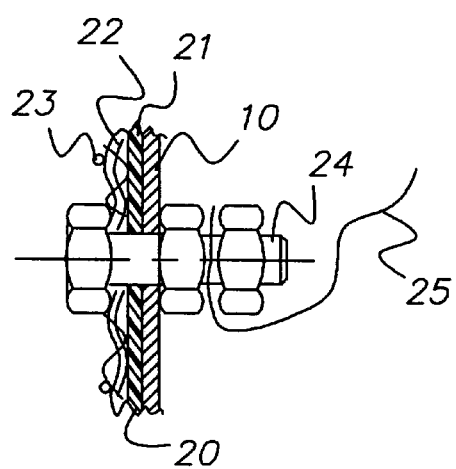
FIG. 3 is a partial cross-sectional view along line 3—3 showing the cathode assembly wall construction with an electrical connection.

The cathode assembly and an anode spaced apart from it are generally in a cell housing or shell of suitable nonconductive material. The cathode assembly can be arranged in relation to the anode in various configurations. Preferably, the cathode assembly has a circular geometry, and the anode is coaxially disposed around it (for example, see FIG. 1). Electrical connections to the cathode assembly and anode can be made with any suitable means, such as current feeder bolts (see FIGS. 3 and 5 discussed below).

The cathode assembly has several components. The innermost component is a nonporous support member having uniformly distributed fluid openings or fluid collection channels arranged therein so that suitable uniform pressure drop is achieved along the entire surface of the primary cathode. The support member is nonporous meaning that it is composed of an impermeable material and inert to the treated fluid. It can be constructed of a number of nonporous, nonconductive structurally strong materials including, but not limited to, ceramics, thermoplastic polymer materials (such as polyvinylchloride and high density polyethylene) and thermoset polymeric materials [such as polyesters, phenolic resins and acrylonitrile-butadiene-styrene polymer (ABS)]. Preferably, the support member is constructed from polyvinylchloride. It can have an appropriate thickness to insure sufficient strength and durability for the intended use.

In one embodiment, the support member has small holes uniformly distributed throughout its length, through which the fluid flows under pressure, and then out of the cell. The size of the holes can vary as long as a uniform pressure drop is achieved. Generally, such holes would be less than 10 mm in diameter (and preferably even smaller) to provide adequate fluid pressure drop.

More preferably, the support member is grooved, machined, ribbed or indented in its outer surface so that fluid is caused to flow longitudinally along fluid collection channels that are formed by the support member and the primary cathode in contact therewith. This novel uniform distribution of fluid allows the cell to function with higher efficiency and capacity than known electrochemical cells. The restriction of fluid flow imposed by the fluid collection channels also imparts an unexpectedly strong beneficial effect in the uniformity of metal deposition on the primary cathode. The volumetric rate of fluid flow past the primary cathode, and the resulting turbulence and mass transfer of metal ions is affected by the particular geometry chosen for the fluid collection channels. For example, the depth and width of the channels affect the metal ion mass transfer.

The fluid collection channels may be rectangular slots each having a depth equal to its width, or may have other geometry that can provide the desired pressure drop and mass transfer along the entire length of the cathode assembly. Alternatively, each fluid collection channel may have a width and depth that are unequal that provide a particular pressure drop profile throughout the length of the cathode assembly commensurate with the respective volume at that point. Furthermore, the width and/or depth of each channel may increase or decrease linearly or non-linearly from one end of the cell to the other to obtain a different pressure drop profile that matches the needs of a given metal recovery operation.

In addition, the fluid collection channels need not form straight lines from one end of the cell to the other. For example, they can be arranged in a zigzag or serpentine pattern if that would aid fluid distribution. The total flow of fluid through the cell is constant due to the constant rate of discharge of fluid from the circulation pump. Hence, increasing or decreasing the width or depth of the channels at a given point along the length of the cathode assembly either increases or decreases the pressure drop at that point accordingly. Thus, decreasing the volume of the fluid collection channel by a change in width and/or depth has the effect of increasing the pressure drop at that point. The converse is also true. With this teaching in mind, a person skilled in the art can readily design a cell to obtain desired fluid flow for a given use. Controlling the volume of fluid by means of the channel dimensions and geometry thus gives the designer of the cell control over the rate of metal ion mass transfer, leading to more uniform metal deposition on the cathode assembly, fewer side reactions and better overall process control.

The conductive primary cathode is arranged in intimate contact with the nonporous support member having the necessary openings or fluid collection channels. This generally means that the primary cathode is disposed in contact with the support member so that the fluid is passing between the primary cathode and the support member. The primary cathode is composed of any suitable conductive, corrosion-resistant material including, but not limited to, cermet, a ferrous metal (such as various stainless steels), a conductive non-ferrous metal, alloy or composite (such as copper, nickel and tin), or a conductive carbon material (such as graphite, doped diamond or reticulated vitreous carbon). The primary cathode can be shaped as a mesh, plate, strip or tube of appropriate size and geometry. Generally, any conductive, corrosion-resistant material (particularly stainless steel) can be used including Type 316 or FERRALIUM™ stainless steel mesh having from 2 to 40 squares per inch (about 4.5 to about 100 squares per cm). One preferred primary cathode material is a stainless steel mesh having 6 squares per inch (about 15 squares per cm) that is commercially available for example from McMaster-Carr.

By the porous material "covering" the primary cathode is meant that fluid must flow through it prior to contact with the primary cathode, no matter what primary cathode geometry is used.

In one embodiment, the porous material covering the primary cathode is a nonconductive porous barrier material. Such porous barrier materials can be a nonconductive cloth or fabric composed of for example, polypropylene, polyethylene, polyester, polyamide (such as nylon) or a cellulosic material such as cotton. The barrier material can also be a blend of any of such materials. A particularly useful nonconductive porous barrier material is a non-woven polypropylene fabric (commercially available for example from McMaster-Carr). Typically, the primary cathode is wrapped one or more times with such a porous barrier material. As noted above, the nonconductive porous barrier material promotes uniform metal deposition on the cathode assembly and facilitates easy removal of deposited metal since it can be readily pulled free of the primary cathode.

The performance of the electrochemical cell is enhanced by the presence of this nonconductive porous barrier material on the outside of the primary cathode. The action of pumping the fluid through the pores of the porous barrier material in close proximity to the primary cathode serves to break up the boundary layer at the primary cathode surface, and further enhances the mass transfer of metal ions to that surface. This "microbaffling" effect by the nonconductive porous barrier material further insures uniform metal deposition. It also has an unexpected benefit of a positive impact on the morphology of the deposited metal.

For example, for the deposition of silver from photoprocessing solutions, the nonconductive porous barrier material promotes deposition of silver with a dense porous morphology having no significant dendrites. This gives an unexpected increase in cell capacity and further improvements in process control. In the absence of the nonconductive porous barrier material, silver deposition was observed to have more elongated dendrites that are undesirable as pointed out above (may cause short circuiting and unwanted side reactions such as production of silver sulfide).

Because of the improved morphology of deposited metal, the pressure drop increases uniformly throughout the cell during fluid treatment. This enables the operator to establish better process control by noting a preset pressure drop value as a means for signaling when cell capacity is exhausted.

The nonconductive porous barrier material also renders metal harvesting relatively easy. It inhibits metal growth between it and the primary cathode. With little adherence between these two components, removal of the deposited metal can be carried out by simply pulling away the porous barrier material and deposited metal thereon from the primary cathode. Without the porous barrier material, the deposited metal tightly adheres to the primary cathode and is removed only with great effort. The deposited metal and porous barrier material are sent to a refiner where the porous barrier material is burned away and the metal is recovered.

In a second and preferred embodiment, the cathode assembly includes one or more layers of an outermost conductive or semi-conductive porous material that is in contact with the primary cathode. This porous material acts as a secondary cathode and generally comprises a flexible conductive or semi-conductive (dielectric) fabric or mesh including, but not limited to, carbon felt, porous conductive polypropylene fabric, woven or non-woven stainless steel or other conductive materials that would be readily apparent to one skilled in the art. Preferably, at least two layers of the porous conductive or semi-conductive fabric or mesh are used. One preferred secondary cathode material is a conductive carbon fiber fabric, such as that commercially available from Osaka Gas.

In a more preferred embodiment, when the primary cathode has a surface area lower than is desired (for example, a metallic strip instead of a metallic mesh), it may be advantageous to wrap the primary cathode with the nonconductive porous barrier material, followed by wrapping it with a conductive porous material (described above). In this embodiment, metal deposition is initiated on the primary cathode and continues until the deposit "grows" through and onto the secondary cathode. The conductive secondary cathode then insures uniform deposition throughout the cathode assembly.

Thus, in operation of the most preferred electrochemical cell, fluid is passed from the vicinity of the anode, through the conductive or semi-conductive porous secondary cathode, through the nonconductive porous barrier material and between the primary cathode and the support member. Deposited metal "grows" outwardly toward the anode, through both the nonconductive porous barrier material and the conductive or semi-conductive secondary cathode. At a suitable time, the deposited metal can be readily removed from the cathode assembly by peeling or stripping off the nonconductive porous material from the primary cathode. The primary cathode can then be wrapped again with additional appropriate porous barrier material and/or conductive porous secondary cathode material, reinserted into the electrochemical cell housing and reused.

To enhance removal of the deposited metal, a narrow strip of the nonconductive porous barrier material or conductive porous secondary cathode can be sealed so fluid cannot flow through it to the primary cathode. Thus, a narrow region of the primary cathode is free of deposited metal and cutting through the porous materials around it is easier. Sealing the porous barrier material can be achieved in a number of ways including applying a silicone sealant or other fluid-impervious material, or a thin plastic strip or other barrier, thereto.

The electrochemical cell contains an anode spaced apart from the cathode assembly as described above. The anode can have any appropriate geometry and be composed of any suitable conductive material, such as those described above for the primary cathode. Preferably, the anode is composed of a cermet, ferrous metal, conductive non-ferrous metal, a conductive carbon material (such as graphite), or conductive polymers. Most preferably, it is composed of 316 stainless steel or graphite.

The cathode assembly and anode can be disposed in a suitable nonconductive container or housing that can also include suitable fluid inlet and outlet means, fluid distribution and collection means, electrical connections, sealing rings or other hardware and plumbing that would be readily apparent to one skilled in the art to render the electrochemical cell useful in any metal recovery process.

In operation, an electrochemical cell, or a plurality of cells disposed in series or parallel arrangements as a metal recovery system, is used to extract metal by applying a negative potential to the cathode assembly. The minimum negative potential will vary with the metal to be recovered and must be at least that required to reduce the positively-charged metal ions to be extracted to their zero electrochemical state. This electrochemical information for chosen metals is readily available in standard electrochemistry publications. The negative potential can be applied using any suitable electrical power supply. An initial electrochemical cell voltage is at least 0.5 volts. Metal recovery is also generally carried out using a current density of from about 0.01 to about 0.2 Amp/cm$^2$.

The fluids that can be treated using the present invention can vary in the type and concentrations of metals ions to be removed. Such fluids are generally aqueous in nature although they may also contain various organic solvents. The sources of the fluids can be industrial reactions, chemical process and other waste streams, water treatment plants or municipal sewers, lakes, ponds, or streams. The present invention therefore would be useful for metal recovery from the mining, electroplating, smelting, waste treatment and photoprocessing industries to recover such metals as silver, gold, copper, lead, tellurium, platinum, palladium and nickel that are generally present at a concentration of at least 1 ppm, and preferably at least 50 ppm. Preferably, the electrochemical cell is used to recover silver from photographic processing solutions that include, but are not limited to, photographic fixing solutions, bleach-fixing solutions, waste water and other waste stream photoprocessing solutions.

Further details of the practice of this invention can be determined by consideration of the preferred electrochemical cell embodiments shown in FIGS. 1–6 and the following explanation thereof. These illustrated embodiments are meant to be representative and not limiting of the present invention in any manner.

Figure 1:
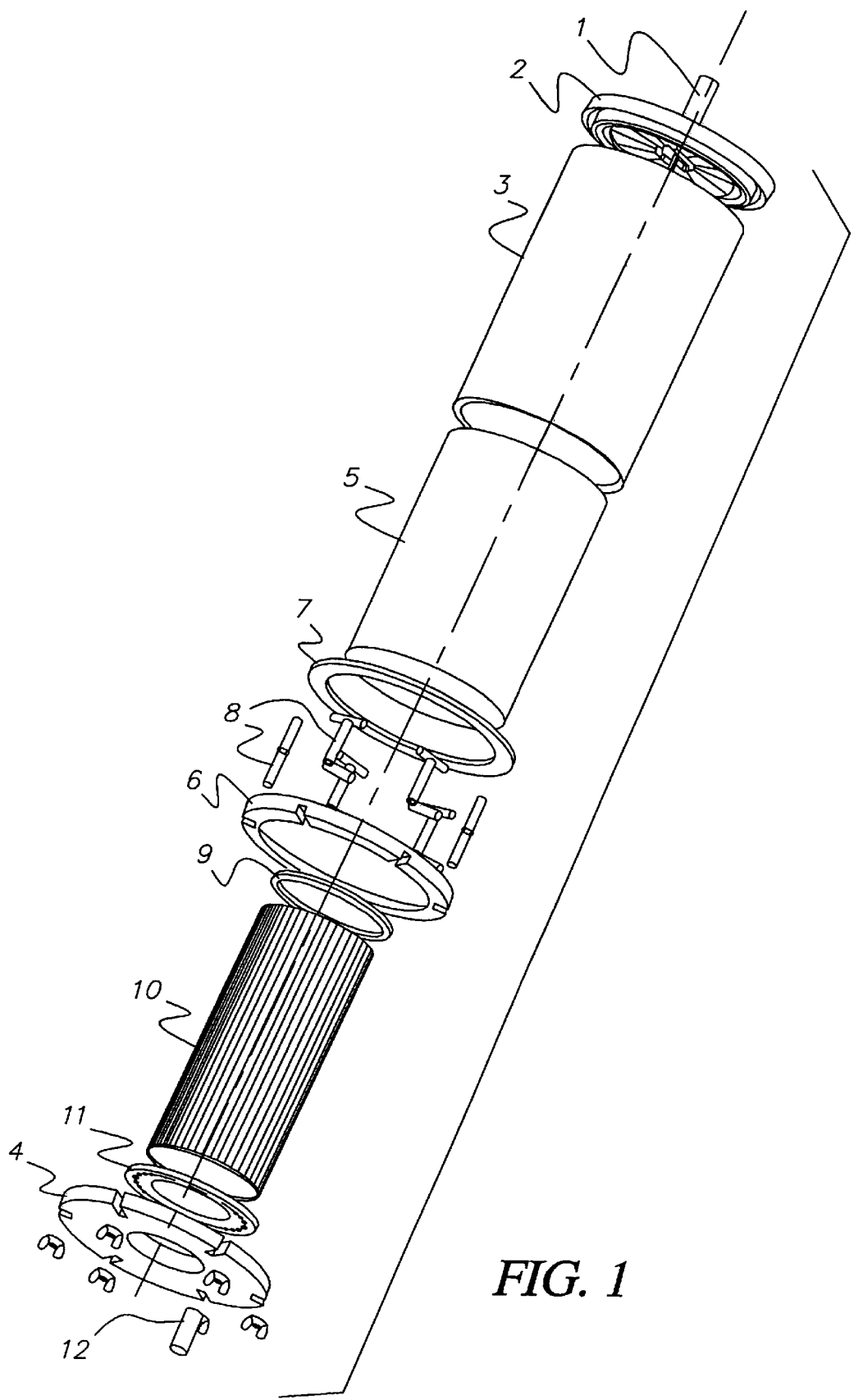
FIG. 1 is an exploded perspective view of most components of a preferred electrochemical cell of this invention.

FIG. 1 shows an exploded perspective view of a preferred electrochemical cell of the present invention. The electrochemical cell is composed of fluid inlet means 1 that delivers fluid to fluid distribution plate 2 that can be designed to uniformly distribute entering fluid to the interelectrode gap within the cell. For example, it can be designed for uniform radial fluid distribution. Fluid inlet means 1 can be a separate component or designed as an integral part of fluid distribution plate 2. Housing 3 (or outer shell) is suitably attached to the fluid distribution plate 2 at one end (either integrated or detachabe) and top plate 4 at the other end (either integrated or detachable), houses electrochemical cell components, and is composed of any suitably strong, non-porous and nonconductive material (such as polyvinylchloride).

Annular anode 5 is slightly smaller in diameter than housing 3 into which it is nested. Housing rings 6 and 7 are disposed and fixed around housing 3 to detachably secure top plate 4 with a series of bolts 8. These rings and bolts serve to keep the cathode assembly in place inside anode 5 and housing 3 during use, while allowing the cathode assembly to be easily removed from the cell when cell capacity has been reached.

Within the cathode assembly, bottom plate 9 rests on fluid distribution plate 2, and aids in forcing fluid into the interelectrode gap. Of the cathode assembly components, the primary cathode and the outermost porous materials are not shown in FIG. 1 so that support member 10 can be better seen, but they would be disposed around it and can be better seen in FIGS. 2 and 3. In FIG. 1, support member 10 is shown as having lengthwise grooves or fluid collection channels. Fluid collection manifold 11 covers the cathode assembly and usually has holes through which fluid can flow and be collected from the cathode assembly. Fluid is then directed out of the cell through fluid outlet 12.

Figure 2:
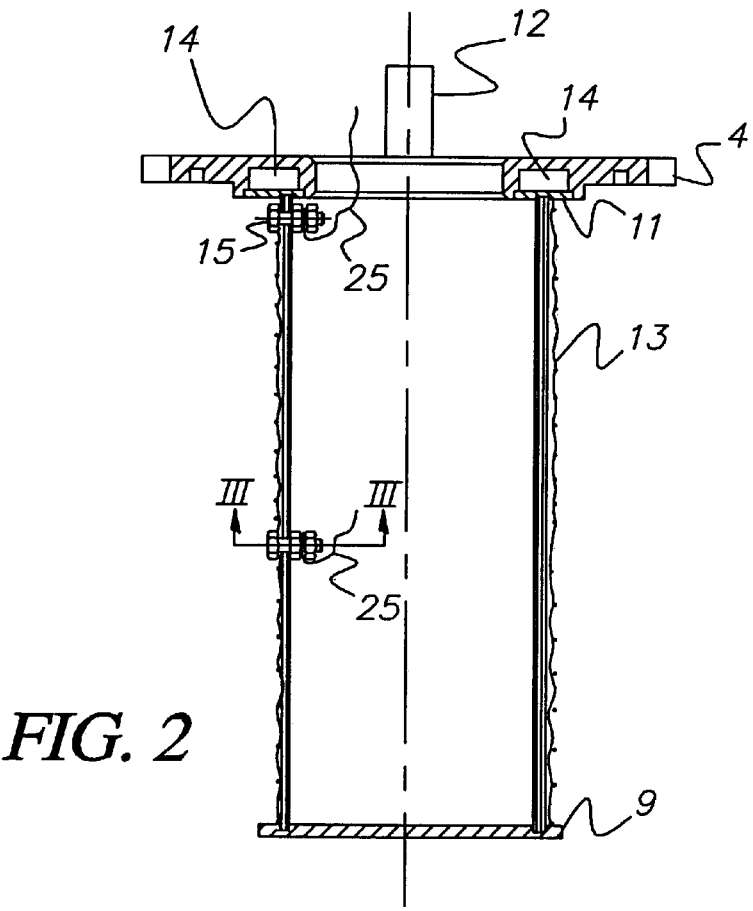
FIG. 2 is a cross-sectional view of a preferred cathode assembly of this invention.

Cathode assembly 13 is shown in FIG. 2 connected to top plate 4 and bottom plate 9. Fluid collection manifold 11 is nested within top plate 4 and has voids 14 in which fluid that has been moved past cathode assembly 13 is collected. An electrical connection is provided to the cathode assembly 13 through current feeder bolt 15. The electrical components of cathode assembly 13 are better seen in partial section FIG. 3. On support member 10 is disposed conductive primary cathode 20 (for example, a stainless steel mesh), nonconductive porous barrier material 21 (for example, polypropylene mesh cloth), conductive porous felt wrap 22 (such as carbon felt) that becomes a secondary cathode during cell operation, and string 23 (such as a common fabric twine) that binds the two porous materials to the primary cathode. Current feeder bolt 24 and wiring 25 provide necessary electrical connection to the electrical power supply.

Figure 4:
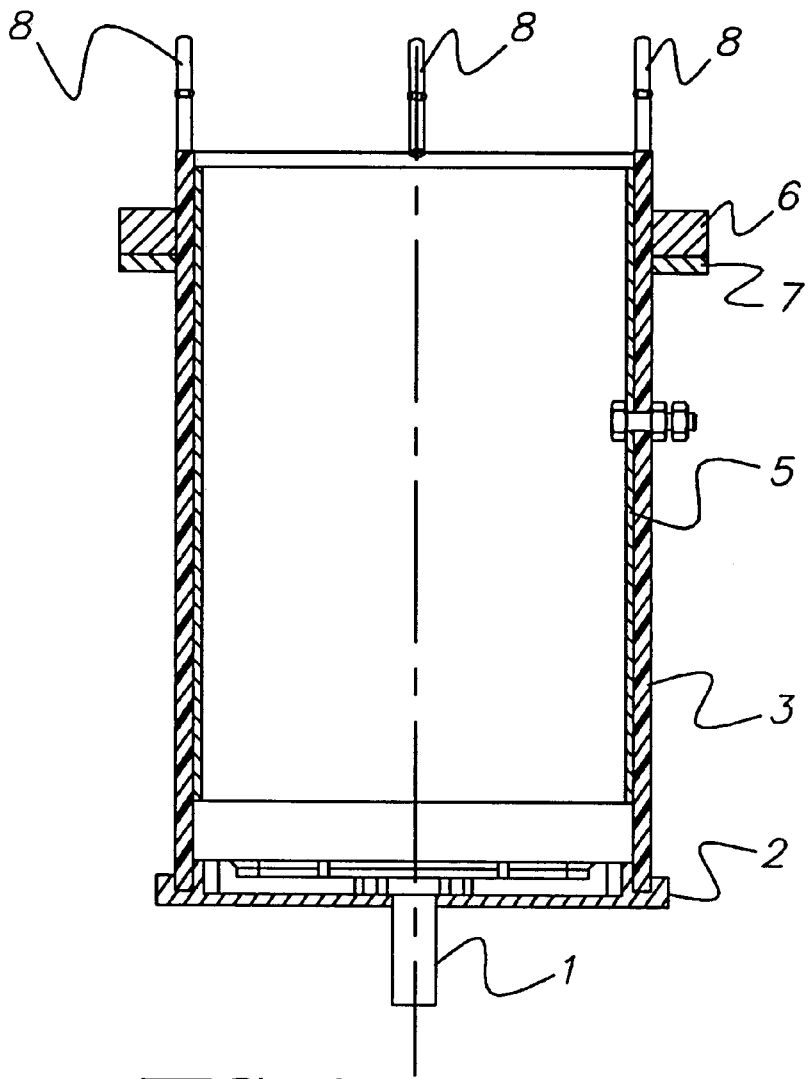
FIG. 4 is a cross-sectional view of an electrochemical "shell" into which the cathode assembly of FIG. 3 can be placed.
Figure 5:
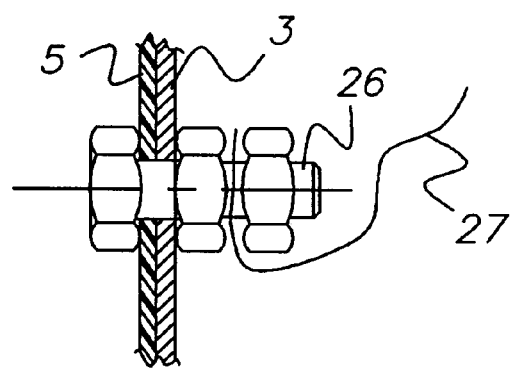
FIG. 5 is a partial cross-sectional view along line 5—5 of the electrochemical "shell" of FIG. 4 with an electrical connection.

FIG. 4 shows electrochemical cell housing 3 connected to fluid inlet means 1 and fluid distribution plate 2. Annular anode 5 is inside housing 3. Housing rings 6 and 7 are shown around housing 3 along with bolts 8. Exploded sectional FIG. 5 shows annular anode 7 inside housing 3 along with current feeder bolt 26 and wiring 27 to provide necessary electrical connection to the electrical power supply.

Thus, in reference to FIGS. 1–5, the method of this invention can be practiced by supplying the fluid to be treated to fluid inlet means 1 that directs it to fluid distribution plate 2 that along with bottom plate 9 disperses it radially and uniformly into the gap between annular anode 5 and the cathode assembly 13 (FIG. 2). Fluid is forced from that gap through the porous secondary cathode 22, nonconductive porous barrier material 21, primary cathode 20 and into the fluid collection channels formed between the primary cathode 20 and the grooved support member 10. Fluid flows along those channels to voids 14 in the fluid collection manifold 11 and then exits the cell through fluid outlet 12.

EXAMPLE 1
Use of Electrochemical Cell in Invention & Comparison

An electrochemical cell substantially like that shown in FIGS. 1–5 was prepared having a an annular anode composed of stainless steel, and a cathode assembly comprised of a polyvinylchloride support member, stainless steel mesh primary cathode (about 0.2 $m^2$ surface area), and a layer or wrapping of conductive needled carbon fiber (7 mm thick, 495 $g/m^2$, Technical Fiber Products). The conductive porous layers were held in place in the cathode assembly with several windings of cotton twine. The support member had machined lengthwise grooves in its surface next to the primary cathode, each groove being about 6 mm in depth and 6 mm at widest width and spaced 6 mm apart. The working volume of this cell was about 10 liters. Thus, this cell did not contain a nonconductive porous barrier material.

A silver ion bearing solution from a photographic fixing bath was pumped through the cell at a rate of 40 l/min, and a constant current of 40 amp was applied. The cell voltage during electrolysis was 2.3–2.5 volts. During a period of 4.5 hours, the silver ion content of the treated solution was reduced from 6.5 g/l to 15 mg/l, representing a current efficiency of 92%. The silver deposited was about 700 g.

Nineteen additional electrolytic processes were performed using the same electrochemical cell with applied constant currents of 20–50 amp. A total of 11.2 kg of silver was deposited before the fluid pressure rose to about 16 $lb/in^2$ ($1 \times 10^6$ $dynes/cm^2$). This rise in fluid pressure was a predetermined indication that cell capacity had been exhausted. Silver deposition was observed to be uniform in nature over the cathode assembly, and exhibited a dense porous morphology with no significant dendrites. The deposited silver was light in color indicating little formation of silver sulfide. There was very little silver debris at the bottom of the cell or in suspension.

Comparison:

For comparative purposes, a commercially available porous cathode electrochemical cell was used for silver recovery from the same type of photographic processing solution. A POROCELL™ electrochemical cell having a porous carbon fiber cathode (an apparent area of 0.2 $m^2$) was used in-line at a constant current of 30 amp and a solution flow rate of about 20 l/min. The concentration of silver ion in the solution entering the cell was maintained at about 1 g/l using a silver probe (Degenkolb Engineering Ltd.). At the noted high silver ion concentrations, there was no chance for silver depletion at the primary cathode surface, thereby reducing the potential for unwanted side reactions.

In spite the highly favorable silver recovery conditions, the POROCELL™ electrochemical cell exhibited low capacity, poor quality silver deposition and sloughing of silver particles from the carbon fiber cathode. In addition, the silver deposit was concentrated at the top 25% of the cathode with very little deposition towards the lower part of the cathode. This non-uniform deposition formed an electrical "bridge" between the cathode and the anode and premature electrical shorting. The electrochemical cell then had to be taken out of service for silver removal. Moreover, because of the nonuniform deposition, the fluid pressure drop was relatively constant throughout electrolysis, eliminating the convenience of establishing a predetermined endpoint for cell capacity by pressure drop, and the bridging between anode and cathode went undetected. This resulted in poor current efficiency and caused harmful side reactions (formation of silver sulfide).

In addition, the deposited silver was poor in quality. It was soft and very dark in color again indicating that significant amounts of silver sulfide had formed. Sloughing of silver metal was extensive in the comparative process. This occurred because of the formation of long dendrites on the cathode that broke off during electrolysis, and formed extensive silver at the bottom of the cell as well as suspended matter.

The working volume of the POROCELL™ electrochemical cell is extremely high. In treating photographic processing solutions, it is preferred to have a working volume as low as possible. With this commercial cell, the working volume was about 16 liters, which in comparison to the cell used in the present invention (having a working volume of only 10 liters), represents considerable wasted space.

EXAMPLE 2
Preferred Embodiment of the Invention

In this example, an electrochemical cell similar to that described in Example 1 was used to remove silver metal from a photographic processing solution. The electrochemical cell, however, additionally comprised a wrapping of a nonconductive porous barrier material and a wrapping of a conductive porous secondary cathode in the cathode assembly. Thus, the primary cathode (0.2 $m^2$ apparent surface area) was wrapped first with a polypropylene fabric (398 mm thick, such as from McMaster-Carr). To further improve the silver harvesting operation, a 0.5 inch (1.25 cm) polyvinylchloride pipe was adhered to the polypropylene fabric using a silicone adhesive to block the flow of fluid in a thin strip along the length of the primary cathode, and to thereby prevent silver deposition in that thin area.

The polypropylene fabric was wrapped with a conductive needled carbon fabric (7 mm, Technical Products, Inc.) to serve as a secondary cathode that was held in place by several windings of cotton twine. This conductive fabric was butted against the polyvinylchloride pipe described above.

A total of ten photographic processing solution batches were treated using this electrochemical cell. Each batch typically included about 160 liters, and was supplied to the cell at a rate of about 40 l/min. A constant current of 50 amp was applied to the cell, and the cell voltage during electrolysis was 2.7–3.3 volts. During a period of 4.5 hours, the silver ion concentration was decreased in the treated solutions from 6.2 g/l to 25 mg/l. This represents a current efficiency of about 100%. For this example, the total silver deposited from each batch was from 0.5 to 1 kg.

After nine additional processing solution batches were treated in the same cell using an applied current of 50 amp to treat photographic processing solutions having volumes of 135 to 220 liters. After accumulating about 6.4 kg of silver on the cathode assembly, the small polyvinylchloride pipe was removed and a knife was used to cut through the conductive carbon fabric and the polypropylene fabric where the pipe had been. The bulk of the silver was easily peeled off the primary cathode within a few minutes with the aid of a screwdriver.

EXAMPLE 3
Use of Electrochemical Cell Without Secondary Cathode

In this example, an electrochemical cell was constructed and used as in Example 1, except that the primary cathode was wrapped with a layer of polypropylene fabric to provide a nonconductive porous barrier material, but there was no secondary cathode provided. As in Example 2, a polyvinylchloride pipe was attached to the fabric in a narrow area to block fluid flow in that area along the length of the primary cathode.

Six photographic processing solution batches were treated, each batch containing about 220 liters that were pumped through the cell at a rate of about 40 l/min. A constant current of 50 amp was applied to the cell, and the cell voltage during electrolysis was 2.7–2.8 volts. During a treatment period of 3 hours and 20 minutes, the silver ion concentration was reduced in the solutions from 3 g/l to 35 mg/l, representing a current efficiency of about 100%. The total silver deposited was about 4.5 kg.

When the cell fluid pressure reached 15 lb/in$^2$ (1.03×10$^6$ dynes/cm$^2$), the small pipe was removed from the polypropylene fabric, and a knife was used to cut through the fabric. The silver and fabric were easily removed from the primary cathode with the aid of a screwdriver within a few minutes.

The invention has been described in detail with particular reference to preferred embodiments thereof, but it will be understood that variations and modifications can be effected within the spirit and scope of the invention.

We claim:

1. An electrochemical cell comprising:
   (a) a cathode assembly comprising:
      a nonporous support member having uniformly distributed fluid openings or fluid collection channels to provide a uniform fluid pressure drop in said cathode assembly,
      a conductive primary cathode in intimate contact with said support member, and
      at least one conductive or semi-conductive porous secondary cathode covering said primary cathode, and
   (b) an anode spaced from said cathode assembly.

2. The electrochemical cell of claim 1 wherein said conductive or semi-conductive porous secondary cathode is in contact with said primary cathode.

3. The electrochemical cell of claim 2 wherein said porous secondary cathode is composed of a carbon felt.

4. The electrochemical cell of claim 1 wherein said cathode assembly has a circular geometry, and said anode is coaxially disposed around said cathode assembly.

5. The electrochemical cell of claim 1 wherein said cathode assembly has a planar geometry.

6. The electrochemical cell of claim 1 wherein said support member is composed of a nonconductive material.

7. The electrochemical cell of claim 6 wherein said support member is composed of a ceramic, thermoplastic polymeric material or a thermoset polymeric material.

8. The electrochemical cell of claim 1 wherein said primary cathode is composed of a corrosion-resistant cermet, ferrous metal, conductive non-ferrous metal or conductive carbon material.

9. The electrochemical cell of claim 8 wherein said primary cathode is composed of a corrosion-resistant stainless steel mesh.

10. The electrochemical cell of claim 1 further comprising a non-conductive porous barrier material comprising polypropylene, polyethylene, polyester, polyamide or cotton, or a blend of two or more of these.

11. The electrochemical cell of claim 10 wherein a narrow strip of said nonconductive porous barrier material is sealed to fluid flow.

12. The electrochemical cell of claim 10 wherein a conductive porous secondary cathode is on the outside of said non-conductive porous barrier material.

13. The electrochemical cell of claim 1 wherein said cathode assembly and said anode are spaced apart from about 0.1 to about 20 cm.

14. The electrochemical of claim 1 wherein said anode is composed of a cermet, ferrous metal, conductive non-ferrous metal or a conductive carbon material.

15. The electrochemical cell of claim 1 wherein said fluid openings in said support are of equivalent size and evenly distributed in said support.

16. The electrochemical cell of claim 1 wherein said support member has uniformly distributed fluid collection channels.

17. The electrochemical cell of claim 1 wherein said cathode assembly and said anode are disposed in a nonconductive housing.

18. A metal recovery system comprising a plurality of electrochemical cells as claimed in claim 1, said cells being disposed in a series or parallel arrangement.

19. An electrochemical cell comprising a cathode assembly having a circular geometry and comprising:
   a non-porous support member composed of polyvinylchloride and having uniformly distributed fluid collection channels to provide a uniform fluid pressure drop in said cathod assembly,
   a conductive primary cathode in intimate contact with said support member, said primary cathode composed of stainless steel mesh,
   a nonconductive porous barrier material covering said primary cathode, said barrier material composed of a nonconductive polypropylene, polyethylene, polyester, polyamide or cotton material, or a blend of any two of these materials, and
   a conductive porous secondary cathode on the outside of said nonconductive porous barrier material, said conductive porous secondary cathode being composed of a carbon felt, conductive polypropylene fabric, or woven or non-woven stainless steel, and
   an anode coaxillay spaced from said cathode assembly at about 3 to about 8 cm.

20. The electrochemical cell of claim 19 wherein a narrow strip of said nonconductive porous barrier material is sealed to fluid flow.

21. An electrochemical cell comprising:
   (a) a cathode assembly comprising:
      a nonporous support member having uniformly distributed fluid openings or fluid collection channels to provide a uniform fluid pressure drop in said cathode assembly, a conductive primary cathode in intimate contact with said support member, and
      at least one porous material covering said primary cathode such that the deposited metal is predominantly collected in and on the porous material, and
   (b) an anode spaced from 0.1 to 20 cm from said cathode assembly to allow the deposited metal to grow outwardly toward the anode and such that the deposited metal can be readily removed from the rest of the cathode assembly with the porous material.

22. An electrochemical cell comprising:
(a) a fluid distribution plate for uniformly distributing entering fluid to an interelectrode gap within the cell;
(b) a cathode assembly having a circular geometry comprising:
   a nonporous support member having fluid collection channels, which support member is hollow inside such that the volume of fluid required to fill the cell during operation is only that volume of the interelectrode gap,
   a conductive primary cathode in intimate contact with said support member, and
   at least one porous material covering said primary cathode, and
(c) an annular anode coaxially disposed around and spaced from said cathode assembly to form the interelectrode gap through which fluid is forced during operation, and
(d) a fluid collection manifold and fluid outlet for allowing said fluid flowing along said collection channels to exit the cell.

* * * * *